(12) United States Patent
Zhang (10) Patent No.: US 8,342,001 B2
(45) Date of Patent: Jan. 1, 2013

(54) CRIMPING/CUTTING WORKING HEAD FOR IMPACT WRENCH

(75) Inventor: Lei Zhang, Tianjin (CN)

(73) Assignee: Link-Tech (Tianjin) Metal Products Co., Ltd., Beichen District, Tianjin (CN)

( * ) Notice: Subject to any disclaimer, the term of this patent is extended or adjusted under 35 U.S.C. 154(b) by 381 days.

(21) Appl. No.: 12/814,444

(22) Filed: Jun. 12, 2010

(65) Prior Publication Data
US 2011/0289998 A1 Dec. 1, 2011

(30) Foreign Application Priority Data

May 28, 2010 (CN) ...................... 2010 2 0206197 U (51) Int. Cl.
*B21J 9/18* (2006.01)

(52) U.S. Cl. ............... 72/453.16; 72/453.15; 72/409.19; 29/751

(58) Field of Classification Search ............ 72/237, 72/389.8, 390.4, 390.6, 409.1, 409.2, 409.5, 72/409.16, 410, 455, 452.4, 452.8, 453.02, 72/453.15, 453.16, 456, 413, 416, 453.01, 72/409.19, 480, 481.1, 482.91; 29/751, 753
See application file for complete search history.

(56) References Cited

U.S. PATENT DOCUMENTS

| 4,480,460 | A * | 11/1984 | Bush et al. | 72/409.01 |
| 4,622,752 | A * | 11/1986 | Harra | 33/628 |
| 4,942,757 | A * | 7/1990 | Pecora | 72/453.16 |
| 6,434,998 | B2 * | 8/2002 | Amherd | 72/416 |
| 7,434,441 | B2 * | 10/2008 | Frenken | 72/409.19 |
| 7,578,159 | B2 * | 8/2009 | Bowles et al. | 72/409.01 |
| 7,628,052 | B2 * | 12/2009 | Zhang | 72/409.16 |
| 7,908,741 | B2 * | 3/2011 | Chawgo | 29/751 |
| 2007/0119607 | A1 * | 5/2007 | Lin | 173/213 |
| 2010/0000288 | A1 * | 1/2010 | Barezzani et al. | 72/453.15 |

* cited by examiner

*Primary Examiner* — Dana Ross
*Assistant Examiner* — Homer Boyer (57) ABSTRACT

A power operated crimping/cutting tool driven by any type of impact wrench, with a crimping or cutting working head, includes a transmission unit, a connection unit, a process indication device and an adjustment device, wherein the transmission unit includes a jaw device and a transmission device, the jaw device is detachable, both the process indication device and the adjustment device are mounted on the transmission unit, the connection unit is sleevedly mounted at the impact wrench. The present invention can replace the jaw device according to different requirements.

20 Claims, 8 Drawing Sheets

CRIMPING/CUTTING WORKING HEAD FOR IMPACT WRENCH

BACKGROUND OF THE PRESENT INVENTION

1. Field of Invention

The present invention relates to a power operated crimping/cutting tool driven by any type of impact wrench (corded, cordless, or pneumatic), and more particularly to a crimping/cutting working head for impact wrench.

2. Description of Related Arts

Crimp connection pipe and wire, cutting bolt etc. are widely used. There are wide range of power tool and manual tool available. The power tool is mainly hydraulic type, which is expensive and difficult to calibration, while the manual tool has less capacity.

Pressing tongs are used primarily for sanitary installations in order to connect two pipes or pipe sections to one another by means of connecting members, so-called fittings. For this purpose, the connecting members are slipped over the ends of two pipes and are then plastically deformed in order to achieve a fixed connection between the two pipes by means of the connecting member. The pressing tongs have two pressing jaws for this purpose with machined system-specific pressing contours, respectively. In order to actuate the pressing jaws and, in particular, to exert the pressing force, the pressing tongs are connected by a connector to a motor-driven actuating device having an axially movable plunger. Such actuating devices operate electro-mechanically or electro-hydraulically. The plunger supports pressing rolls with which, upon extension of the plunger, the pressing tongs are closed and the pressing force is exerted.

Thus, there is a need for a tool which is easy to operate, fast to install, efficiently to work and low in labor intensity.

SUMMARY OF THE PRESENT INVENTION

An object of the present invention is to provide a power operated crimping/cutting tool driven by any type of impact wrench (corded, cordless, or pneumatic) to overcome the drawbacks of conventional tools.

Another object of the present invention is to provide a crimping/cutting working head which comprises a jaw device can be rotated at a range of 360 degree, and replaced according to different specifications and requirements.

Another object of the present invention is to provide a crimping/cutting working head which can replace dies conveniently and quickly without loosing and tightening screws.

Another object of the present invention is to provide a crimping/cutting working head which comprises a process indication device, when the jaw device is operated to a right position, the process indication device emits light; and a plug-and-play adjustable board.

Another object of the present invention is to provide a crimping/cutting working head which has strong practicability and is a new power tool for connecting large diameter pipes.

Accordingly, in order to accomplish the above objects, the present invention provides a crimping/cutting working head for impact wrench comprises a transmission unit, a connection unit, a process indication device and an adjustment device, wherein the transmission unit comprises a jaw device and a transmission device, the transmission device comprises a sleeve, two pairs of connecting sheets, a frame, a screw assembly and a pair of transmission connecting shafts, wherein the connection unit comprises an aluminum sheath, a pair of connecting shafts, a connecting plate, a pair of first connecting bolts, a second connecting bolt, wherein the jaw device is detachable, a rear portion of the crimping jaw is connected to one end of the connecting sheet by a connecting pin-shaft of the transmission device, while another end of the connecting sheet is connected to the frame by the connecting shaft, wherein the frame is sleevedly mounted in the sleeve, a rear portion of the frame is connected to the screw assembly via screw structure, wherein the sleeve is connected to the covers, and the sleeve is encased in the aluminum sheath, wherein both the process indication device and the adjustment device are mounted on the transmission unit, wherein a rear portion of the aluminum sheath is sleevedly mounted at an impact wrench and fixed thereat by the connecting plate and the connecting shafts.

The jaw device is a crimping device, which comprises a pair of crimping jaws, a pair of dies, a pair of covers, a pair of pin-shafts, a pair of die connecting shafts, two pairs of die positioning shafts and a pair of springs, wherein a plurality of fixed holes are provided in the corresponding position of the crimping jaws and the dies respectively, the dies are connected to the crimping jaws by the die connecting shafts and the die positioning shafts. The springs are respectively sleeved in the die connecting shafts. A plurality of grooves is provided in the middle of the crimping jaws, and an upper and a lower surfaces of the crimping jaws, in order to reduce the weight of the crimping jaws.

A concave groove is provided in an upper portion of the covers for preventing reversely installing the dies.

Alternatively, the jaw device is a cutting device, which comprises a pair of cutting jaws, a pair of covers, a pair of pin-shafts.

The screw assembly of the transmission device comprises a screw, a press bearing, and a connecting nut, wherein one end of the screw is connected to the impact wrench by the press bearing.

The frame has a plurality of battery holes for mounting battery therein.

The process indication device comprises a battery, a battery cover, a LED, a light cover, a contact screw, a connecting screw, a nylon ferrule and a plurality of electrical wires, wherein an negative plate of the LED is connected to an negative plate of the battery, while an positive plate of the LED is connected to the contact screw, wherein the nylon ferrule is sleeved outside the contact screw for preventing current leakage.

A hooking slot provided at a rear portion of the sleeve.

The adjustment device is a plug-and-play adjustable board connected to the frame, wherein the adjustable board having a hook provided at an upper portion of the adjustable board, wherein hook matches with the hooking slot in shape.

The he aluminum sheath consists of a front aluminum sheath and a rear aluminum sheath, wherein a plurality of holes are provide in a front portion of the front aluminum sheath for mounting the light cover.

The front aluminum sheath has a plurality of rotating slots provided at an outer surface of an rear portion of the front aluminum sheath, correspondingly, the rear aluminum sheath has an protruding rings provided at an inner surface of the rear aluminum sheath, under the interaction between the rotating slots and the protruding rings, the jaw device 1 could rotate 360 degree.

The process indication device is mounted on the frame, and connected to the sleeve by electrical wires to form a closed circuit.

Therefore, the beneficial effects of the present invention are illustrated as follows: firstly, the jaw device can be replaced according to different specifications and requirements in order to meet various purposes such as crimping or cutting; secondly, the dies can be replaced dies conveniently and quickly; thirdly, using a process indication device to indicate work status, when the jaw device is operated to a right position, the process indication device emits light; fourthly, the adjustment device is a simple plug-and-play adjustable board which can adjust the jaw mouth, so as to avoid the error caused by wear; fifthly, the crimping/cutting working head of the present invention provides powerful force, which can connect the large diameter pipes together easily.

These and other objectives, features, and advantages of the present invention will become apparent from the following detailed description, the accompanying drawings, and the appended claims.

In FIGS: 1 jaw device; 1-1 crimping jaw; 1-2 die; 1-3 cover; 1-4 pin-shaft; 1-5 groove; 1-6 die connecting shafts; 1-7 die positioning shafts; 1-8 concave groove; 1-9 connecting hole; 1-10 spring; 1-11 cutting jaw; 2 transmission device; 2-1 sleeve; 2-2 connecting sheet; 2-3 frame; 2-4 screw; 2-5 press bearing; 2-6 connecting nut; 2-7 connecting shaft; 2-8 connecting pin-shaft; 2-9 battery hole; 3 connection unit; 3-1 connecting plate; 3-2 connecting shaft; 3-3 first nuts; 3-4 front aluminum sheath; 3-5 rear aluminum sheath; 3-6 connecting bolt; 3-7 second connecting bolt; 3-8 second nut; 3-9 fixed screw; 3-10 positioning screws; 3-11 rotating slot; 4 process indication device; 4-1 light cover; 4-2 battery cover; 4-3 contact screw; 4-4 battery; 4-5 LED; 4-6 electrical wire; 4-7 nylon ferrule; 4-8 contact screw; 5 adjustment device; 6 impact wrench.

DETAILED DESCRIPTION OF THE PREFERRED EMBODIMENT

Referring to FIG. 1 to FIG. 7 of the drawings, a crimping/cutting working head for impact wrench according to first preferred embodiment of the present invention is illustrated, in which the crimping/cutting working head for impact wrench comprises a transmission unit, a connection unit 3, a process indication device 4 and an adjustment device 5.

The transmission unit comprises a jaw device 1 and a transmission device 2, wherein the transmission device 2 comprises a sleeve 2-1, two pairs of connecting sheets 2-2, a frame 2-3, a screw assembly and a pair of transmission connecting shafts 2-7.

The connection unit 3 comprises a aluminum sheath, a pair of connecting shafts 3-2, a connecting plate 3-1, a pair of first connecting bolts 3-6, a second connecting bolt 3-7, a pair of first nuts 3-3, a second nut 3-8, a pair of fixed screws 3-9 and a pair of positioning screws 3-10.

Figure 3:
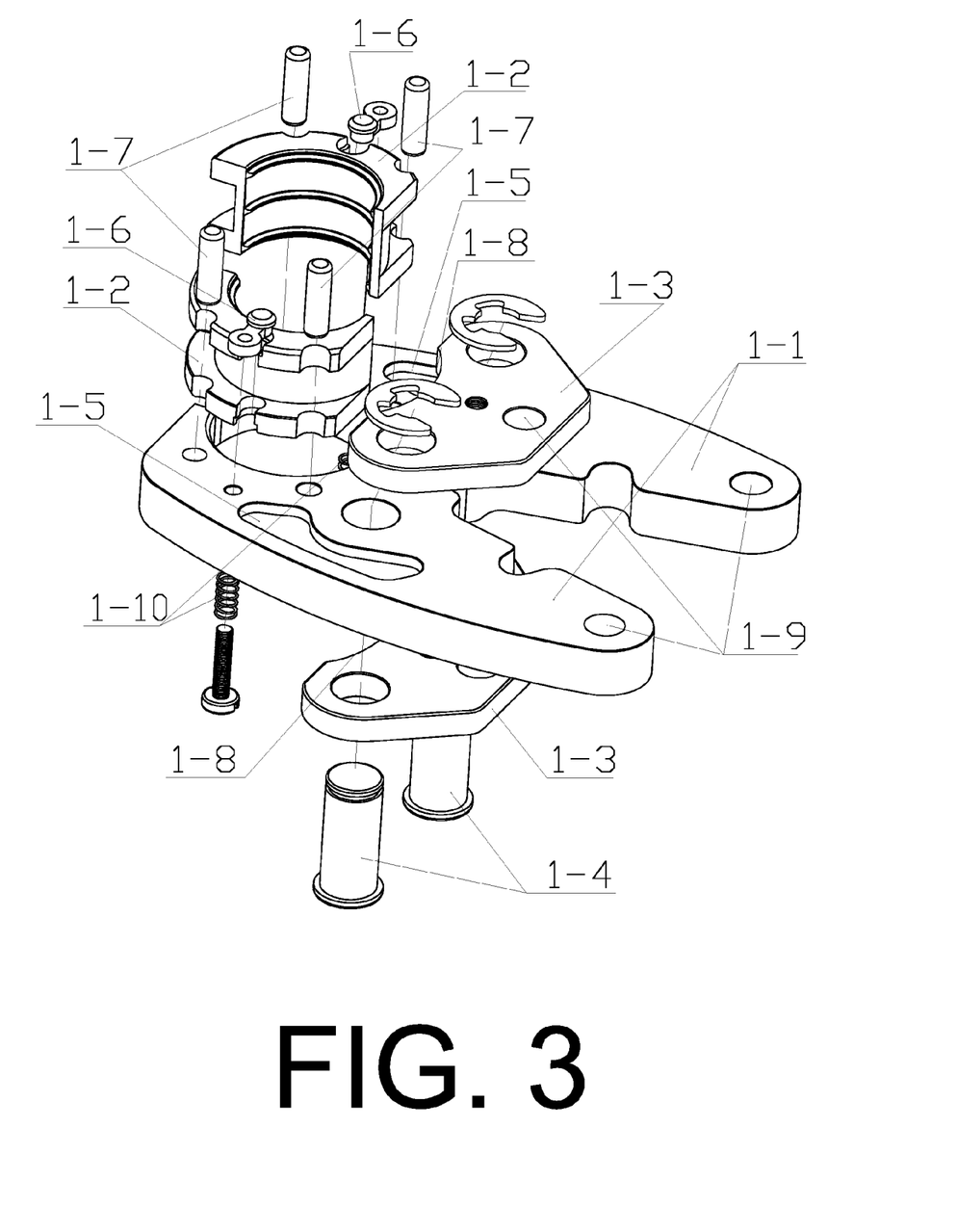
FIG. 3 is an exploded perspective view of a jaw device according to above preferred embodiment of the present invention.

According to the first preferred embodiment, the jaw device 1 is a crimping device, which comprises a pair of crimping jaws 1-1, a pair of dies 1-2, a pair of covers 1-3, a pair of pin-shafts 1-4, a pair of die connecting shafts 1-6, two pairs of die positioning shafts 1-7 and a pair of springs 1-10. Here, a plurality of fixed holes are provided in the corresponding position of the crimping jaws 1-1 and the dies 1-2 respectively, the dies 1-2 are connected to the crimping jaws 1-1 by the die connecting shafts 1-6 and the die positioning shafts 1-7. The springs 1-10 are respectively sleeved in the die connecting shafts 1-6, when to replace the dies 1-2 quickly in response to different specifications and requirements, it is conveniently and quickly to take the dies 1-2 out only by pressing down the die positioning shafts 1-7. The pair of crimping jaws 1-1 is movably connected to the covers 1-3 by a pair of pinned shafts 1-4. Preferably, A plurality of grooves 1-5 are provided in the middle of the crimping jaws 1-1, and an upper and an lower surfaces of the crimping jaws 1-1, in order to reduce the weight of the crimping jaws 1-1. A plurality of connecting holes 1-9 is provided in a rear portion of the crimping jaws 1-1. According to the first preferred embodiment, a concave groove 1-8 is provided in an upper portion of the cover 1-3, which is fittedly and shapedly to install the dies 1-2 and can prevent reverse installation. It is worth to mention that the jaw device 1 can be replaced quickly and easily according to user's different requirements, so as to achieve various purposes.

Figure 2:
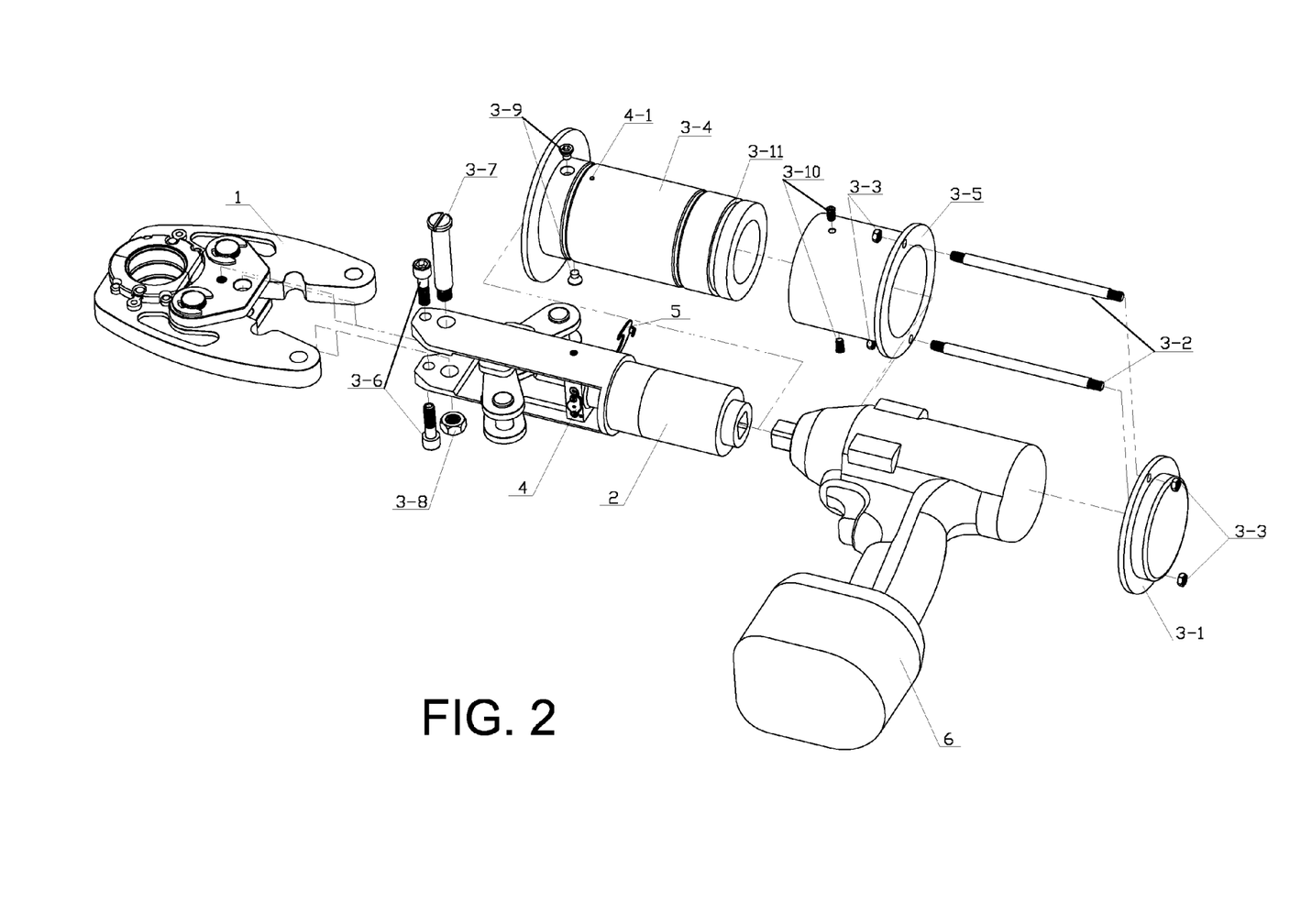
FIG. 2 is an exploded perspective view of a crimping/cutting working head for impact wrench according to above preferred embodiment of the present invention.
Figure 4:
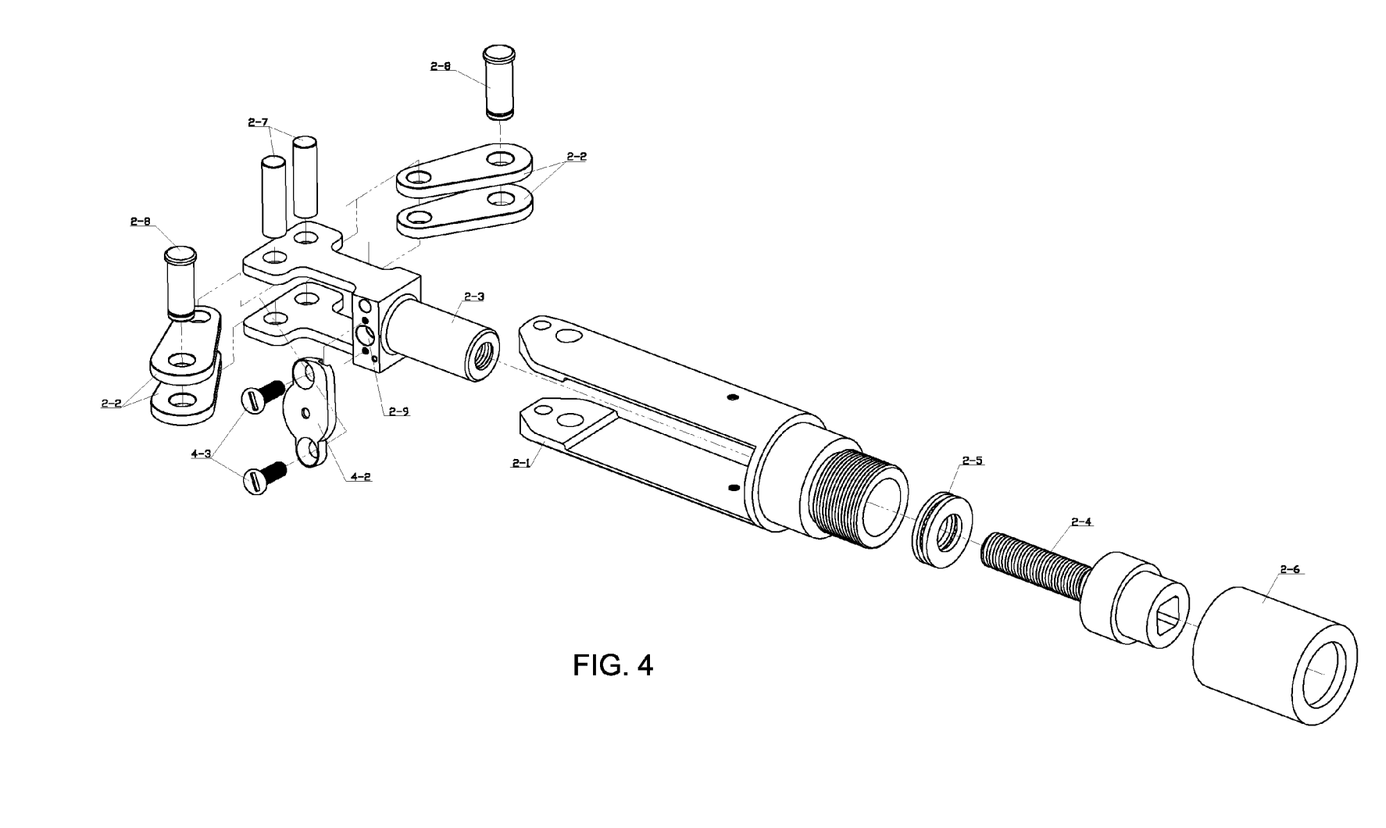
FIG. 4 is an exploded perspective view of a transmission device according to above preferred embodiment of the present invention.

The jaw device 1 is detachable. A rear portion of the crimping jaw 1-1 is connected to one end of the connecting sheet 2-2 by a connecting pin-shaft 2-8 of the transmission device 2, while another end of the connecting sheet 2-2 is connected to the frame 2-3 by the connecting shaft 2-7. The frame 2-3 is sleevedly mounted in the sleeve 2-1, a rear portion of the frame 2-3 is connected to the screw assembly via screw structure. The sleeve 2-1 is connected to the covers 1-3 by the first connecting bolts 3-6 and the second connecting bolt 3-7, and the sleeve 2-1 is encased in the aluminum sheath.

Figure 1:
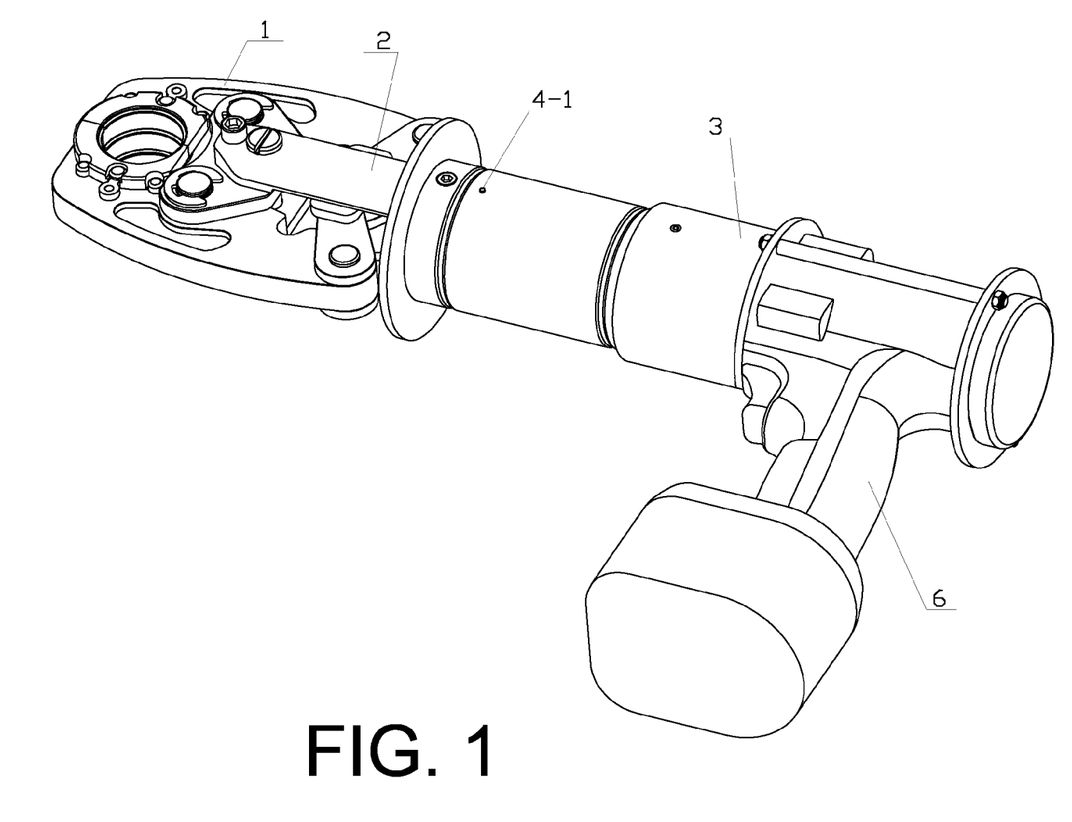
FIG. 1 is a perspective view of a crimping/cutting working head for impact wrench according to a first preferred embodiment of the present invention.

Both the process indication device 4 and the adjustment device 5 are mounted on the transmission unit. A rear portion of the aluminum sheath is sleevedly mounted at an impact wrench 6 and fixed thereat by the connecting plate 3-1, the connecting shafts 3-2, and the first nuts 3-3.

The crimping jaw 1-1 can be embodied as a clamp-ring jaw, a clamp-sleeve jaw, or a clamp-hoop jaw.

The screw assembly of the transmission device 2 comprises a screw 2-4, a press bearing 2-5, and an connecting nut 2-6, wherein one end of the screw 2-4 is connected to the impact wrench 6 by the press bearing 2-5.

The frame 2-3 has a plurality of battery holes 2-9 for mounting battery 4-4 therein.

Figure 6:
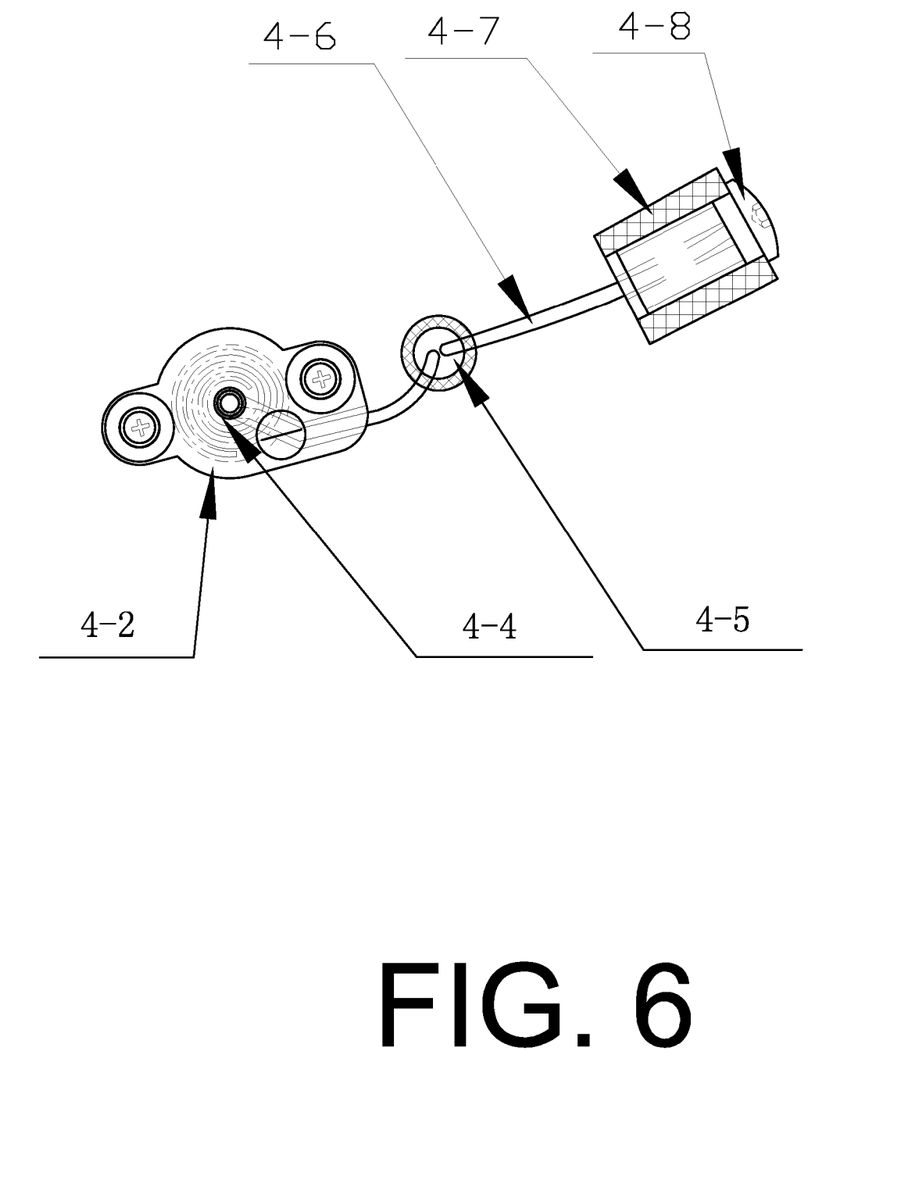
FIG. 6 is a perspective view of a process indication device according to above preferred embodiment of the present invention.
Figure 7:
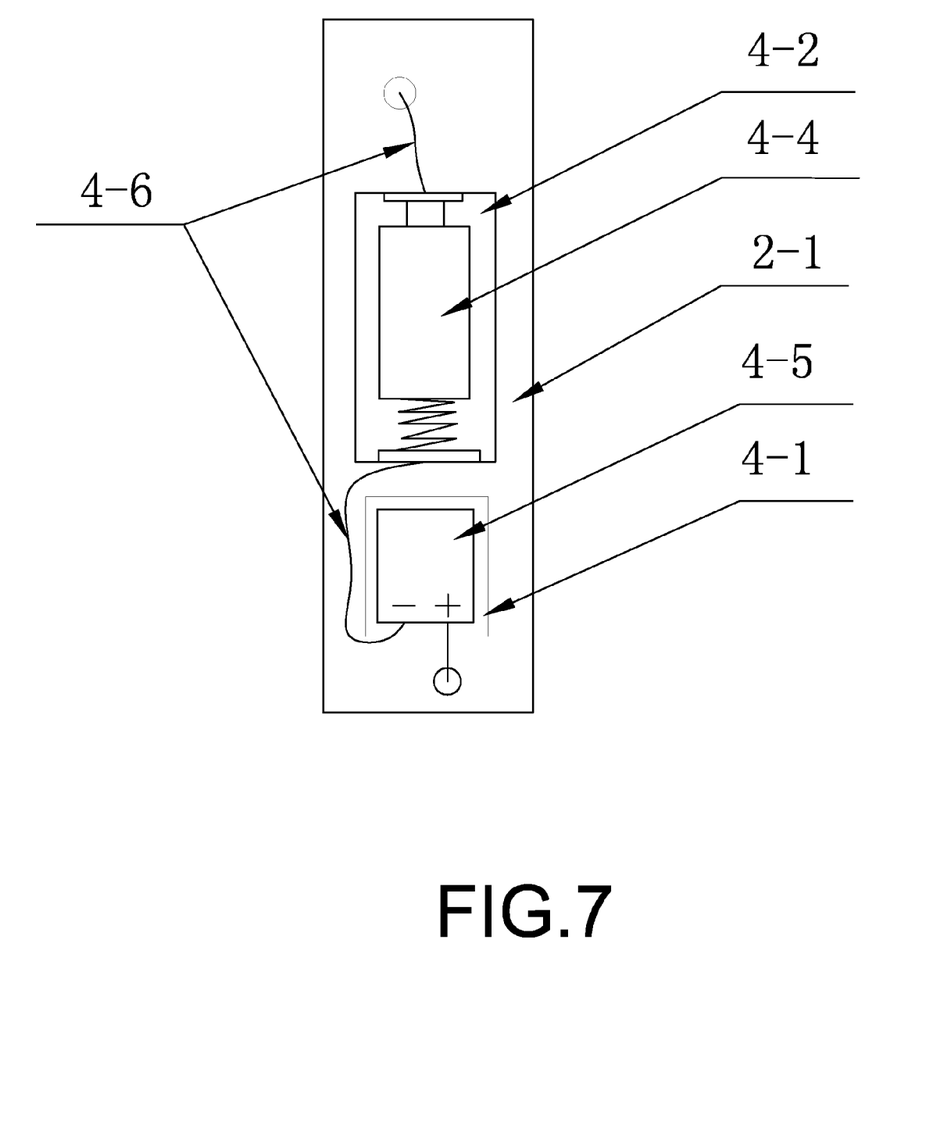
FIG. 7 is a perspective view of a process indication device according to above preferred embodiment of the present invention, illustrating electrical connection of the process indication device.

Referring to FIG. 6 and FIG. 7, the process indication device 4 comprises a battery 4-4, a battery cover 4-2, a LED 4-5, a light cover 4-1, a contact screw 4-8, a connecting screw 4-3, a nylon ferrule 4-7 and a plurality of electrical wires 4-6, wherein an negative plate of the LED 4-5 is connected to an negative plate of the battery, while an positive plate of the LED 4-5 is connected to the contact screw 4-3. It is preferably that the nylon ferrule 4-7 is sleeved outside the contact screw 4-8 for preventing current leakage.

Preferably, there is a hooking slot provided at a rear portion of the sleeve 2-1.

Figure 5:
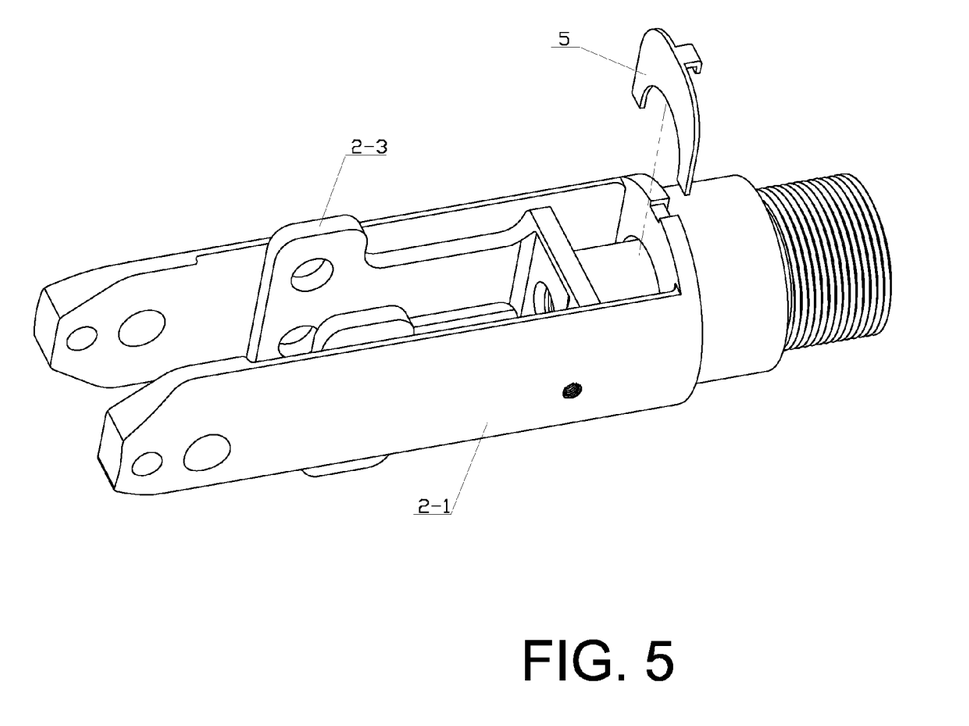
FIG. 5 is a perspective view of connection between an adjustment device and a transmission device according to above preferred embodiment of the present invention.

The adjustment device 5 is preferably a plug-and-play adjustable board connected to the frame 2-3, wherein the adjustable board having a hook provided at an upper portion thereof, wherein hook matches with the hooking slot in shape. The adjustable board is preferably provided in various specifications according to different adjustment ranges.

The aluminum sheath consists of a front aluminum sheath 3-4 and a rear aluminum sheath 3-5. The light cover 4-1 is mounted at a front portion of the front aluminum sheath 3-4. The process indication device 4 is connected to the sleeve 2-1 by electrical wires 4-6 to form a closed circuit, once the crimping jaw 1-1 is operated to a right position, the LED 4-5 of the process indication device 4 will emit light. The front aluminum sheath 3-4 has a plurality of rotating slots 3-11 provided at an outer surface of an rear portion of the front aluminum sheath 3-4, correspondingly, the rear aluminum sheath 3-5 has an protruding rings provided at an inner surface of the rear aluminum sheath 3-5, under the interaction between the rotating slots 3-11 and the protruding rings, the jaw device 1 could rotate 360 degree.

Referring to FIG. 2, FIG. 4 to FIG. 8 of the drawings, a crimping/cutting working head for impact wrench according to second preferred embodiment of the present invention is illustrated, in which the crimping/cutting working head for impact wrench comprises a transmission unit, a connection unit 3, a process indication device 4 and an adjustment device 5.

The transmission unit comprises a jaw device 1 and a transmission device 2, wherein the transmission device 2 comprises a sleeve 2-1, two pairs of connecting sheets 2-2, a frame 2-3, a screw assembly and a pair of transmission connecting shafts 2-7.

The connection unit 3 comprises a aluminum sheath, a pair of connecting shafts 3-2, a connecting plate 3-1, a pair of first connecting bolts 3-6, a second connecting bolt 3-7, a pair of first nuts 3-3, a second nut 3-8, a pair of fixed screws 3-9 and a pair of positioning screws 3-10.

Figure 8:
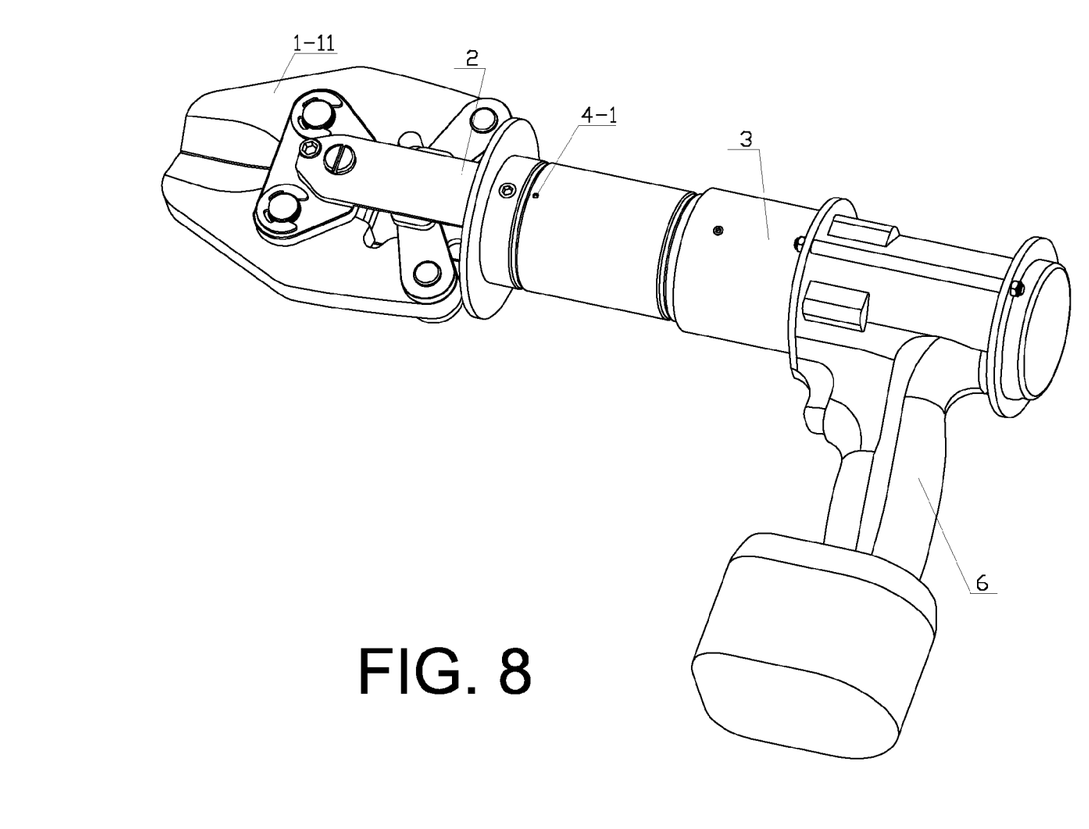
FIG. 8 is a perspective view of a crimping/cutting working head for impact wrench according to a second preferred embodiment of the present invention.

According to the second preferred embodiment, the jaw device 1 is a cutting device, which comprises a pair of cutting jaws 1-11, a pair of covers 1-3, a pair of pin-shafts 1-4, a pair of die connecting shafts 1-6, two pairs of die positioning shafts 1-7 and a pair of springs 1-10, wherein the cutting jaws 1-11 is movably connected to the covers 1-3 by a pair of pinned shafts 1-4, and a plurality of connecting holes 1-9 is provided in a rear portion of the cutting jaws 1-11.

The jaw device 1 is detachable. A rear portion of the cutting jaw 1-11 is connected to one end of the connecting sheet 2-2 by a connecting pin-shaft 2-8 of the transmission device 2, while another end of the connecting sheet 2-2 is connected to the frame 2-3 by the connecting shaft 2-7. The frame 2-3 is sleevedly mounted in the sleeve 2-1, a rear portion of the frame 2-3 is connected to the screw assembly via screw structure. The sleeve 2-1 is connected to the covers 1-3 by the first connecting bolts 3-6 and the second connecting bolt 3-7, and the sleeve 2-1 is encased in the aluminum sheath.

Both the process indication device 4 and the adjustment device 5 are mounted on the transmission unit. A rear portion of the aluminum sheath is sleevedly mounted at an impact wrench 6 and fixed thereat by the connecting plate 3-1, the connecting shafts 3-2, and the first nuts 3-3.

The screw assembly of the transmission device 2 comprises a screw 2-4, a press bearing 2-5, and an connecting nut 2-6, wherein one end of the screw 2-4 is connected to the impact wrench 6 by the press bearing 2-5.

The frame 2-3 has a plurality of battery holes 2-9 for mounting battery 4-4 therein.

Referring to FIG. 6 and FIG. 7, the process indication device 4 comprises a battery 4-4, a battery cover 4-2, a LED 4-5, a light cover 4-1, a contact screw 4-8, a connecting screw 4-3, a nylon ferrule 4-7 and a plurality of electrical wires 4-6, wherein an negative plate of the LED 4-5 is connected to an negative plate of the battery, while an positive plate of the LED 4-5 is connected to the contact screw 4-3. It is preferably that the nylon ferrule 4-7 is sleeved outside the contact screw 4-8 for preventing current leakage.

Preferably, there is a hooking slot provided at a rear portion of the sleeve 2-1.

The adjustment device 5 is preferably a plug-and-play adjustable board connected to the frame 2-3, wherein the adjustable board having a hook provided at an upper portion thereof, wherein hook matches with the hooking slot in shape. The adjustable board is preferably provided in various specifications according to different adjustment ranges.

The aluminum sheath consists of a front aluminum sheath 3-4 and a rear aluminum sheath 3-5. The light cover 4-1 is mounted at a front portion of the front aluminum sheath 3-4. The process indication device 4 is connected to the sleeve 2-1 by electrical wires 4-6 to form a closed circuit, once the cutting jaw 1-11 is operated to a right position, the LED 4-5 of the process indication device 4 will emit light. The front aluminum sheath 3-4 has a plurality of rotating slots 3-11 provided at an outer surface of an rear portion of the front aluminum sheath 3-4, correspondingly, the rear aluminum sheath 3-5 has an protruding rings provided at an inner surface of the rear aluminum sheath 3-5, under the interaction between the rotating slots 3-11 and the protruding rings, the jaw device 1 could rotate 360 degree.

The work principle of the present invention is as follows: the screw assembly is rotated driven by the impact wrench 6, so as to drive the transmission device 2 to do push and pull movement, then the crimping jaw 1-1 (or the cutting jaw 1-11) of the jaw device 1 is done open and close movement driven by the transmission device 2. Once the crimping jaw 1-1 (or the cutting jaw 1-11) is operated to a right position, the LED 4-5 of the process indication device 4 will emit light.

It is worth to mention that the crimping jaws 1-1 and the cutting jaws 1-11 are alternative in use, the crimping jaws 1-1 and the cutting jaws 1-11 can replace each other according to different requirements.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A crimping or cutting working head for impact wrench, comprising:
   a transmission unit, comprising:
   a detachable jaw device, which comprises:

two pairs of jaws: a pair of crimping jaws, and a pair of cutting jaws, wherein said crimping jaws and said cutting jaws are alternative in use;

a pair of dies connected to said jaws respectively by a pair of die connecting shafts and two pair of die positioning shafts, and a pair of covers respectively provided at an upper surface and a lower surface of said jaws, wherein said jaws are movably connected to said covers; and a transmission device, which comprises a sleeve connected to said cover, a frame is sleevedly mounted in said sleeve, two pairs of connecting sheets, wherein one end of each connecting sheet is connected to a rear portion of said jaw, another end of each connecting sheet is connected to said frame, and a screw assembly connected to a rear portion of said frame via screw structure; and a connection unit connecting said transmission unit to the impact wrench.

2. The crimping or cutting working head, as recited in claim 1, further comprising a process indication device mounted on said transmission device by electrical wires to form a closed circuit, wherein said process indication device comprises a battery, a LED electrically connected to said battery, a contact screw electrically connected to said LED, wherein when said jaw device is operated to a right position, said LED emits light.

3. The crimping or cutting working head, as recited in claim 1, further comprising a plug-and-play adjustable board connected to said frame.

4. The crimping or cutting working head, as recited in claim 2, further comprising a plug-and-play adjustable board connected to said frame.

5. The crimping or cutting working head, as recited in claim 4, wherein a hook is provided at an upper portion of said adjustable board, and a hooking slot is provided at a rear portion of said sleeve, wherein said hook and said hooking slot are shape matching.

6. The crimping or cutting working head, as recited in claim 1, wherein said dies connected to said jaws by a pair of die connecting shafts and two pair of die positioning shafts, said jaw device further comprises a pair of springs respectively sleeved in said die connecting shafts, wherein pressing down said die positioning shafts, said springs are triggered to drive said dies out.

7. The crimping or cutting working head, as recited in claim 2, wherein said dies connected to said jaws by a pair of die connecting shafts and two pair of die positioning shafts, said jaw device further comprises a pair of springs respectively sleeved in said die connecting shafts, wherein pressing down said die positioning shafts, said springs are triggered to drive said dies out.

8. The crimping or cutting working head, as recited in claim 5, wherein said dies connected to said jaws by a pair of die connecting shafts and two pair of die positioning shafts, said jaw device further comprises a pair of springs respectively sleeved in said die connecting shafts, wherein pressing down said die positioning shafts, said springs are triggered to drive said dies out.

9. The crimping or cutting working head, as recited in claim 5, wherein a plurality of grooves are provided in middle, said upper surface and said lower surface of said jaws, for reducing weight of said jaws.

10. The crimping or cutting working head, as recited in claim 8, wherein a plurality of grooves are provided in middle, said upper surface and said lower surface of said jaws, for reducing weight of said jaws.

11. The crimping or cutting working head, as recited in claim 8, wherein a concave groove is provided in an upper portion of said covers for preventing reversely installing said dies.

12. The crimping or cutting working head, as recited in claim 2, said process indication device further comprising a nylon ferrule sleeved outside said contact screw for preventing current leakage.

13. The crimping or cutting working head, as recited in claim 5, said process indication device further comprising a nylon ferrule sleeved outside said contact screw for preventing current leakage.

14. The crimping or cutting working head, as recited in claim 10, said process indication device further comprising a nylon ferrule sleeved outside said contact screw for preventing current leakage.

15. The crimping or cutting working head, as recited in claim 14, wherein said adjustable board is provided in various specifications according to different adjustment ranges.

16. The crimping or cutting working head, as recited in claim 1, wherein said connection unit comprises a aluminum sheath sleeved in said sleeve, said aluminum sheath consists of a front aluminum sheath and a rear aluminum sheath, wherein said front aluminum sheath has a plurality of rotating slots provided at an outer surface of an rear portion thereof, correspondingly, said rear aluminum sheath has an protruding rings provided at an inner surface thereof, under interaction between said rotating slots and said protruding rings, said jaw device is rotated at a range of 360 degree.

17. The crimping or cutting working head, as recited in claim 5, wherein said connection unit comprises a aluminum sheath sleeved in said sleeve, said aluminum sheath consists of a front aluminum sheath and a rear aluminum sheath, wherein said front aluminum sheath has a plurality of rotating slots provided at an outer surface of an rear portion thereof, correspondingly, said rear aluminum sheath has an protruding rings provided at an inner surface thereof, under interaction between said rotating slots and said protruding rings, said jaw device is rotated at a range of 360 degree.

18. The crimping or cutting working head, as recited in claim 8, wherein said connection unit comprises a aluminum sheath sleeved in said sleeve, said aluminum sheath consists of a front aluminum sheath and a rear aluminum sheath, wherein said front aluminum sheath has a plurality of rotating slots provided at an outer surface of an rear portion thereof, correspondingly, said rear aluminum sheath has an protruding rings provided at an inner surface thereof, under interaction between said rotating slots and said protruding rings, said jaw device is rotated at a range of 360 degree.

19. The crimping or cutting working head, as recited in claim 14, wherein said connection unit comprises a aluminum sheath sleeved in said sleeve, said aluminum sheath consists of a front aluminum sheath and a rear aluminum sheath, wherein said front aluminum sheath has a plurality of rotating slots provided at an outer surface of an rear portion thereof, correspondingly, said rear aluminum sheath has an protruding rings provided at an inner surface thereof, under interaction between said rotating slots and said protruding rings, said jaw device is rotated at a range of 360 degree.

20. The crimping or cutting working head, as recited in claim 19, wherein said process indication device further comprises a light cover mounted at a front portion of said front aluminum sheath.

* * * * *